US009119078B2

(12) United States Patent
Kokubo

(10) Patent No.: US 9,119,078 B2
(45) Date of Patent: Aug. 25, 2015

(54) MOBILE TERMINAL APPARATUS

(71) Applicant: Sony Mobile Communications Inc., Tokyo (JP)

(72) Inventor: Takeshi Kokubo, Kanagawa (JP)

(73) Assignees: Sony Corporation, Tokyo (JP); Sony Mobile Communications, Inc., Tokyo (JP)

(*) Notice: Subject to any disclaimer, the term of this patent is extended or adjusted under 35 U.S.C. 154(b) by 0 days.

(21) Appl. No.: 14/081,619

(22) Filed: Nov. 15, 2013

(65) Prior Publication Data

US 2014/0080448 A1 Mar. 20, 2014

Related U.S. Application Data

(60) Continuation of application No. 13/457,527, filed on Apr. 27, 2012, now Pat. No. 8,611,862, which is a continuation of application No. 12/431,429, filed on Apr. 28, 2009, now Pat. No. 8,208,901, which is a division of application No. 10/790,676, filed on Mar. 3, 2004, now Pat. No. 7,526,275.

(30) Foreign Application Priority Data

Mar. 7, 2003 (JP) ................................ 2003-061233

(51) Int. Cl.

| | |
|---|---|
| ***H04W 12/12*** | (2009.01) |
| ***H04M 1/66*** | (2006.01) |
| ***H04M 1/725*** | (2006.01) |

(52) U.S. Cl.

CPC ................ *H04W 12/12* (2013.01); *H04M 1/66* (2013.01); *H04M 1/72552* (2013.01); *H04M 2203/553* (2013.01)

(58) Field of Classification Search

CPC H04M 1/66; H04M 1/7252; H04M 2203/553

USPC ......... 455/410, 550.01, 551, 552.1, 587, 566, 455/575.1, 575.3, 556.2; 379/93.24; 713/201, 150

See application file for complete search history.

(56) References Cited

U.S. PATENT DOCUMENTS

| | | | | |
|---|---|---|---|---|
| 5,734,978 | A | 3/1998 | Hayatake et al. | |
| 5,842,124 | A | 11/1998 | Kenagy et al. | |
| 5,987,609 | A | 11/1999 | Hasebe | |
| 6,161,185 | A * | 12/2000 | Guthrie et al. | 726/5 |
| 6,741,851 | B1 | 5/2004 | Lee et al. | |

(Continued)

FOREIGN PATENT DOCUMENTS

| | | |
|---|---|---|
| JP | 07193865 | 7/1995 |
| JP | 411261630 | 9/1999 |

(Continued)

*Primary Examiner* — Melur Ramakrishnaiah

(74) *Attorney, Agent, or Firm* — Fishman Stewart Yamaguchi PLLC

(57) ABSTRACT

A mobile terminal apparatus checks if a user is a proper user based on the operation of the user and, if the result of authentication is negative, uploads predetermined data, which is part of data stored in a memory, to a predetermined server. After the transmission is completed, the mobile terminal apparatus erases the uploaded data from the memory. It is also possible to instruct the mobile terminal apparatus to upload and erase data from an external source using an electronic mail or a telephone tone signal sequence. This may protect data contained in mobile terminal apparatus that has been lost, from a person who improperly attempts to access the data.

36 Claims, 9 Drawing Sheets

DATA UPLOAD (3)
START
RECEIVE TELEPHONE CALL AUTOMATICALLY? S701
ACCEPT INPUT VIA DTMF SIGNAL S702
PERFORM AUTHENTICATION S703
AUTHENTICATION SUCCESSFUL? S704
ACCEPT COMMAND S705
COMMANDS MATCH? S706
DISCONNECT LINE S707
DISCONNECT LINE S713
DISABLE KEY OPERATION S708
TRANSMIT SPECIFIED DATA TO SERVER S709
TRANSMISSION FINISHED? S710
ERASE SPECIFIED DATA S711
ENABLE DISABLED KEY OPERATION S712
END

(56) References Cited

U.S. PATENT DOCUMENTS

| | | | |
|---|---|---|---|
| 7,047,426 B1 | 5/2006 | Andrews et al. | |
| 7,200,220 B1 | 4/2007 | Yamao | |
| 7,448,068 B2 * | 11/2008 | Sun et al. | 726/2 |
| 2002/0172363 A1 | 11/2002 | Dierks et al. | |
| 2003/0013491 A1 | 1/2003 | Moriki | |
| 2003/0054800 A1 | 3/2003 | Miyashita | |
| 2003/0074566 A1 | 4/2003 | Hypponen | |
| 2003/0097596 A1 * | 5/2003 | Muratov et al. | 713/202 |
| 2004/0025053 A1 | 2/2004 | Hayward | |
| 2004/0110488 A1 * | 6/2004 | Komsi | 455/411 |
| 2004/0203594 A1 | 10/2004 | Kotzin et al. | |

FOREIGN PATENT DOCUMENTS

| | | |
|---|---|---|
| JP | 2001309431 A | 11/2001 |
| JP | 2002259310 A | 9/2002 |
| JP | 2003061151 A | 2/2003 |
| KR | 2003-0001725 A | 1/2003 |

* cited by examiner

DATA UPLOAD (2)
START
S601
MAIL RECEIVED?
NO
YES
CHECK HEADER INFORMATION
S602
S603
UPLOAD SPECIFIED?
NO
YES
S604
PREDETERMINED CONDITION SATISFIED?
NO
YES
S611
USUAL MAIL PROCESSING
DISABLE KEY OPERATION
S605
TRANSMIT SPECIFIED DATA TO SERVER
S606
S607
TRANSMISSION FINISHED?
NO
YES
ERASE SPECIFIED DATA
S608
RETURN RESPONSE MAIL
S609
ENABLE DISABLED KEY OPERATION
S610
END

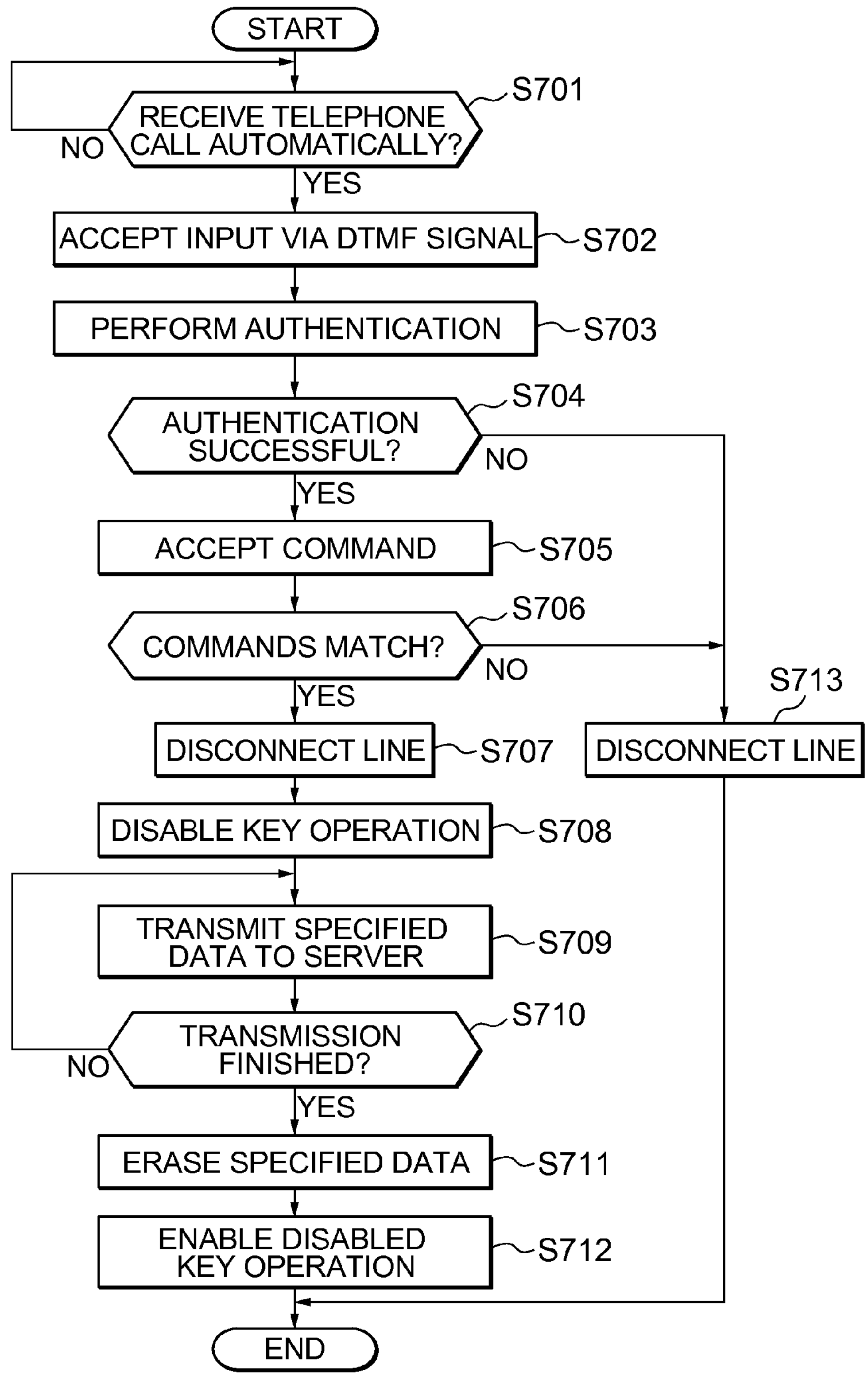
FIG. 7
DATA UPLOAD (3)
START
RECEIVE TELEPHONE CALL AUTOMATICALLY?
S701
NO
YES
ACCEPT INPUT VIA DTMF SIGNAL
S702
PERFORM AUTHENTICATION
S703
AUTHENTICATION SUCCESSFUL?
S704
NO
YES
ACCEPT COMMAND
S705
COMMANDS MATCH?
S706
NO
YES
DISCONNECT LINE
S707
S713
DISCONNECT LINE
DISABLE KEY OPERATION
S708
TRANSMIT SPECIFIED DATA TO SERVER
S709
TRANSMISSION FINISHED?
S710
NO
YES
ERASE SPECIFIED DATA
S711
ENABLE DISABLED KEY OPERATION
S712
END

MOBILE TERMINAL APPARATUS

CROSS REFERENCE TO RELATED APPLICATIONS

The present application is a Continuation of application Ser. No. 13/457,527, filed Apr. 27, 2012 which is a Continuation application of application Ser. No. 12/431,429, filed Apr. 28, 2009, now U.S. Pat. No. 8,208,901, which is a Divisional of application Ser. No. 10/790,676, filed Mar. 3, 2004, now U.S. Pat. No. 7,526,275, which claims priority from Japanese Patent Application JP2003-061233, filed in the Japanese Patent Office on Mar. 7, 2003, the contents in which being incorporated herein by reference.

BACKGROUND OF THE INVENTION

1. Field of the Invention

The present invention relates to a mobile terminal apparatus (in this specification it may be also called simply a terminal in the present specification) such as cellular phone devices and a Personal Digital Assistants (PDAs).

2. Description of Related Art

Mobile terminal apparatuses such as cellular phones and a personal digital assistants (PDAs) may to be lost or stolen because of its portability. When a mobile terminal apparatus storing personal information such as telephone book data, memo data, and electronic mail (email) data is stolen or lost, data including the personal information may be improperly accessed or altered.

Although attempts have been made for assuring security against unauthorized access to data in a terminal when necessary through the introduction of various types of authentication methods, the conventional authentication method is not necessarily effective considering the importance of personal information.

Japanese Patent Publication No. 2001-309431 discloses a technology in which, when a notification indicating that a mobile terminal apparatus is lost is sent to the location registration center of the mobile terminal apparatus, the location registration center causes a base station to send a control signal to the mobile terminal apparatus to disable its key operation when the mobile terminal apparatus communicates with the base station and, after transferring internal data to the database of the location registration center, causes the mobile terminal apparatus to erase the data.

SUMMARY OF THE INVENTION

The technology disclosed in Japanese Patent Publication No. 2001-309431 requires the location registration center and a base station to perform specific processing. That is, the location registration center must manage and check a mobile terminal apparatus that is notified as lost and, when the mobile terminal apparatus notified as lost communicates with a base station, performs special processing including the generation and control of a signal to disable the mobile terminal apparatus operation and to transfer data. Another problem is that the user must notify the location registration center and wait for the notification to be reflected on the processing of the location registration center and the base station.

There is therefore need of providing a mobile terminal apparatus that protects data from those who intend to improperly access or browse internal data, without requiring a location registration center and a base station to perform special processing.

There is also need of providing a mobile terminal apparatus that may protect data immediately when a need arises for protecting data or when a user gets notice of such situation.

There is still a need of providing a mobile terminal apparatus that ensures that data in the terminal will be available for use even if the terminal is lost.

A mobile terminal apparatus according to a preferred embodiment of the present invention includes storage means for storing data; communication means for communicating data via a communication network; authentication means for checking if a user is a proper user based on an operation of the user; and control means for transmitting predetermined data, which is included in the data stored in the storage means, to a predetermined server via the communication means when the result of authentication by the authentication means is negative and, after the transmission is completed, erasing the predetermined data from the storage means.

The authentication means performs authentication processing based on the user operation and, if the result is negative, the control means transmits the predetermined data from the storage means to the server to save the data and, after that, erases the data. This method effectively protects the data from being accessed/browsed or used improperly.

Although the predetermined data may be determined by default, means for allowing the user to specify desired data should preferably be provided. Providing such means may allow the user to protect data not determined by default.

The authentication means performs authentication, for example, when the user attempts to access the predetermined data.

The data erase processing performed after the data is transmitted to the server may also be suppressed depending upon the type of data. Erasing data always requires the user to restore it at a later time. If the erase processing is suppressed according to the importance or relevance of the data, for example, if the erase processing is omitted for data that should be saved but need not be erased, there will be no need for the restore processing.

A mobile terminal apparatus according to another preferred embodiment of the present invention includes storage means for storing data; communication means for communicating an email via a communication network; and control means for transmitting predetermined data to a predetermined server when a previously specified instruction is received via a received electronic mail (hereinafter simply referred to as "email") and, after the transmission is completed, erasing the predetermined data from the storage means.

When a proper user finds that his or her mobile terminal apparatus is lost, the user may remotely instruct the mobile terminal apparatus to save the data stored in the mobile terminal apparatus and then erase it. One proposed way of doing so is sending instruction via an email. In this case, the control means may transmit data to the server if at least one of the following two conditions is satisfied: one condition is that the information on the sender of the email matches the information on the sender, which is stored/registered in advance, and another condition is that the email is received a predetermined number of times within a given length or period of time. This method rejects an unauthorized instruction from an external source.

Another method of allowing the proper user to remotely instruct the mobile terminal apparatus to save data stored in the mobile terminal apparatus and then erase the data is by means of a telephone tone signal sequence. That is, the mobile terminal apparatus includes storage means for storing data; means for automatically receiving a telephone call; means for accepting the input of the tone signal during an automatic call receiving time; and control means for transmitting predetermined data to a predetermined server when a predetermined tone signal sequence is received and, after the transmission is completed, erasing the predetermined data from the storage means.

The mobile terminal apparatus described above is not always required to erase data but, when the authentication result of authentication means is negative, the mobile terminal apparatus is only required to transmit predetermined data, which is part of data stored in the storage means, to the predetermined server via the communication means. This method saves data in the server to ensure its availability.

When the result of authentication is negative, the control means may suppress the authentication processing for accessing data from being executed at least for a given length of time. This preferred embodiment of the present invention does not save or erase data but suppresses the execution of authentication processing to reduce the number of authentication retries. When the result of authentication is negative in a system where there are multiple authentication means, the control means may switch the authentication means to an authentication means of higher level, i.e., an authentication means of higher complexity, for example. As a result, it is possible to reduce the rate of success when performing retrial of authentication.

Suppression (or omission) of authentication processing and switching of authentication means are also effective when data is not transmitted (uploaded) to a server or data is not erased.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which:

FIG. 7 shows a flowchart of an example of third upload processing according to a preferred embodiment of the present invention;

DESCRIPTION OF THE PREFERRED EMBODIMENTS OF THE INVENTION

Preferred embodiments of the present invention will be described in detail as follows, with reference to the accompanying drawings.

Figure 1:
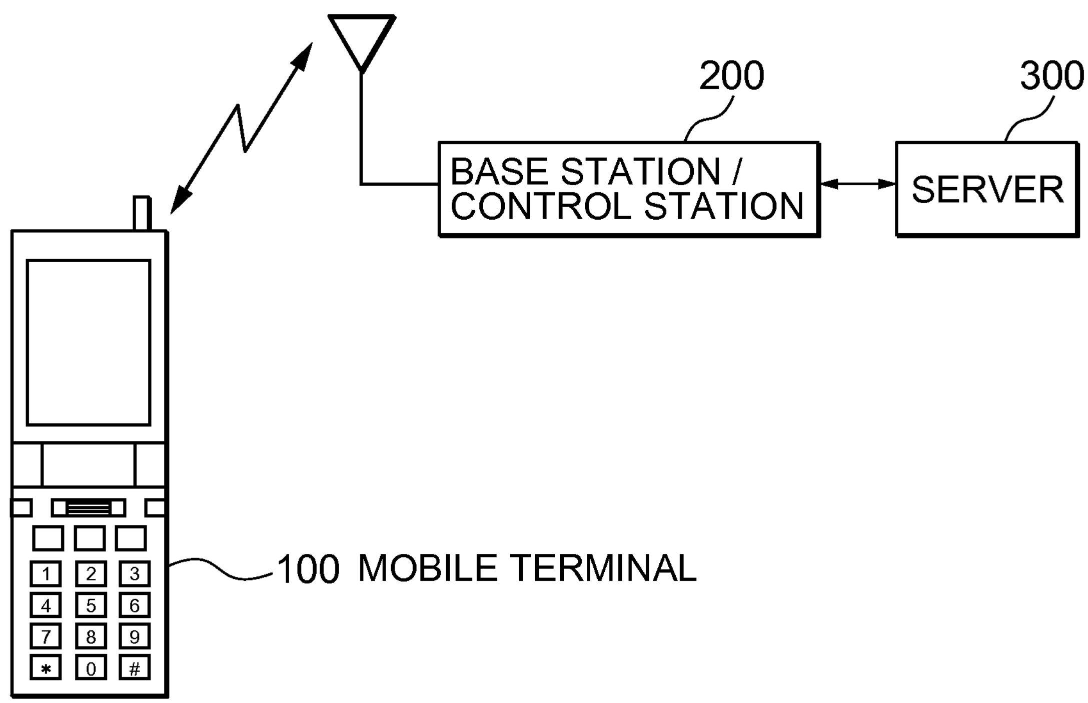
FIG. 1 shows a diagram showing an example of model of a system to which a preferred embodiment of the present invention is applied.

FIG. 1 shows an example of the model of a system to which a preferred embodiment of the present invention is applicable. The system includes a mobile terminal apparatus 100 that may be a cellular phone, a base station/control station 200, and a server 300. The base station and the control station are shown as a station with the functions of both stations. Although connected directly to the base station/control station 200, the server 300 may be connected via a gateway and a communication network such as a public communication network.

Figure 2:
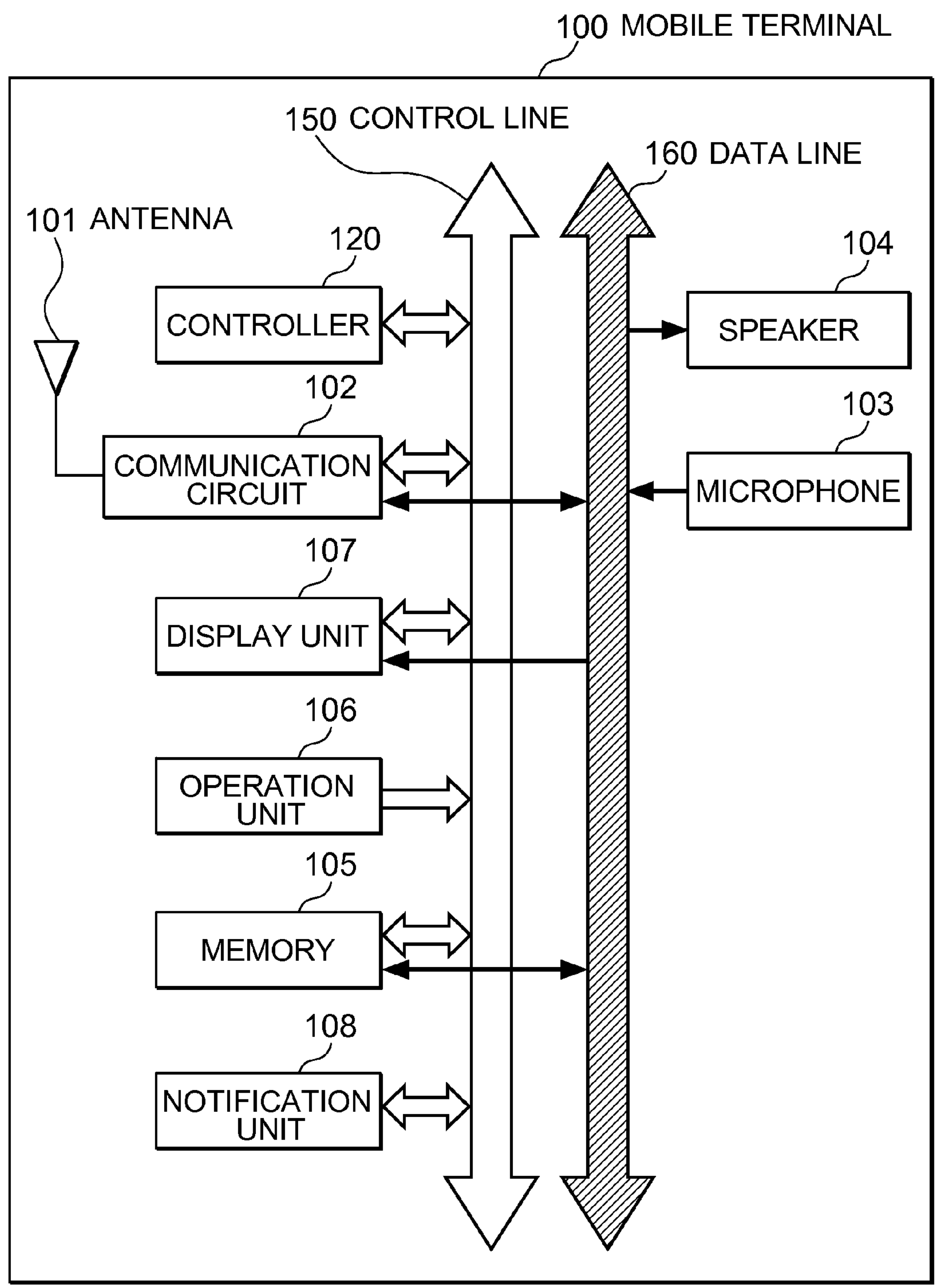
FIG. 2 shows a block diagram of an example of configuration of a mobile terminal apparatus in the system according to FIG. 1.

FIG. 2 shows an example of configuration of the mobile terminal apparatus 100. A controller 120 controls the components of the mobile terminal apparatus 100 via a control line 150 and a data line 160. A communication circuit 102, connected to the control line 150, communicates audio and other kinds of data to or from the base station/control station 200 via an antenna 101. A display unit 107, connected to the control line 150 and the data line 160, has a display device or apparatus such as a liquid crystal display to display various kinds of information. An operation unit 106, connected to the control line 150, has, for example, various operation keys and a jog dial to accept an input operation by the user. A memory 105, connected to the control line 150 and the data line 160, has storage devices such as a ROM, a RAM, and a flash memory to store various programs and data. The memory 105 forms a data holding unit that will be described later. A notification unit 108 may be composed of a vibrator, a LED or other means for visualization, for example. Such unit, connected to the control line 150, notifies the user about an incoming call in a selected way. A microphone 103 and a speaker 104, connected to the data line 160, send and receive audio data.

Figure 3:
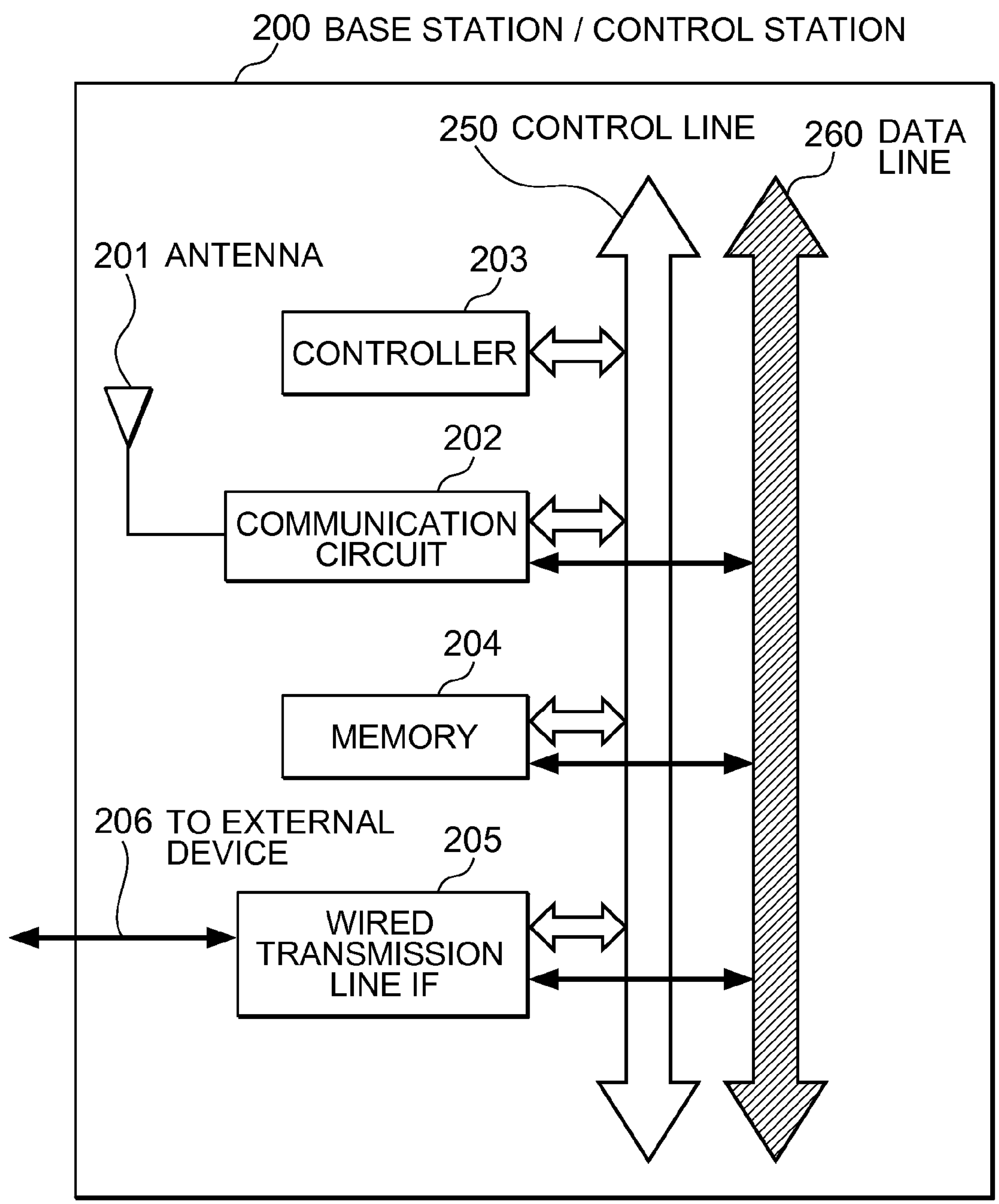
FIG. 3 shows a block diagram of an example of configuration of a base station/control station in the system according to FIG. 1.

FIG. 3 shows an example of configuration of the base station/control station 200. A controller 203 controls the components of the base station/control station 200 via a control line 250 and a data line 260. A communication circuit 202, connected to the control line 250, communicates sound and data to or from the mobile terminal apparatus 100 via an antenna 201. A memory 204, connected to the control line 250 and the data line 260, has storage devices such as a ROM, a RAM, and a flash memory to store, for example, various programs and data. A wired transmission line interface (I/F) 205, connected to the control line 250 and the data line 260, is connected to an external device via a wired transmission line 206.

Figure 4:
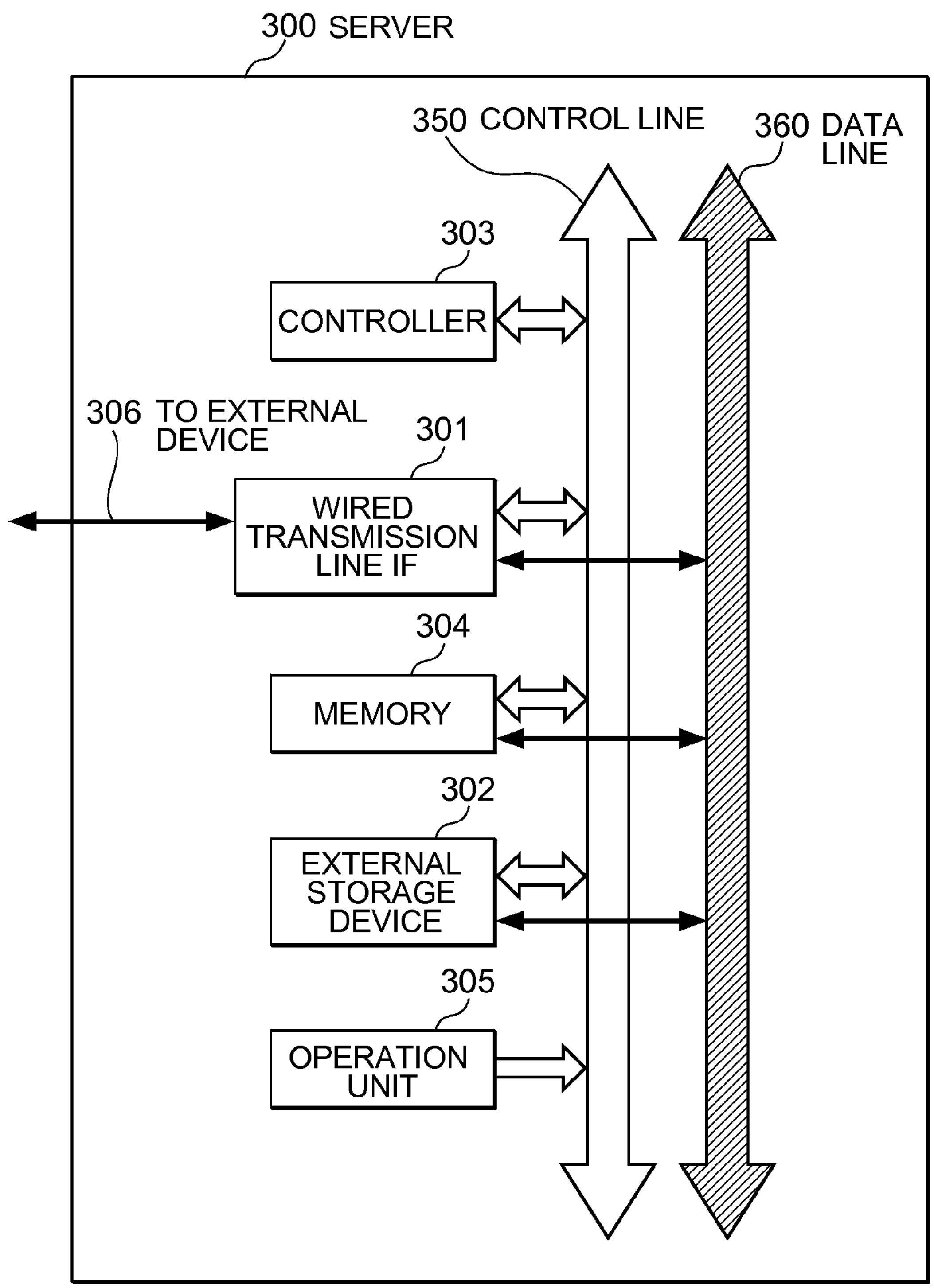
FIG. 4 shows a block diagram of an example of configuration of a server in the system according to FIG. 1.

FIG. 4 shows an example of configuration of the server 300. A controller 303 controls the components of the server 300 via a control line 350 and a data line 360. A wired transmission line interface (I/F) 301, connected to the control line 350 and the data line 360, is connected to an external device via a wired transmission line 306. A memory 304, connected to the control line 350 and the data line 360, has storage devices such as a ROM, a RAM, and a flash memory to store various programs and data. An external storage device 302, a large-capacity storage device such as a hard disk device, is connected to the control line 350 and the data line 360. An operation unit 305 has input means such as a keyboard and a pointing device to accept an input operation from the user. The server 300 may also have a display unit, not shown, including a display device.

The operation of this embodiment of the present invention will be described below. In principle, data is uploaded in this embodiment from the mobile terminal apparatus 100 to the server to send the data according to a predetermined condition and then the data in the mobile terminal apparatus is erased. Uploading in this embodiment means saving of data. The following describes three examples each of which showing different factors that may trigger uploading.

Data to be uploaded in this embodiment may be predetermined data in the data holding unit or a folder (including a mailbox) of data. In addition to or instead of such data, data to be uploaded may be any user-specified data or folder. Data to be uploaded is called "specified data" in this specification.

Figure 5:
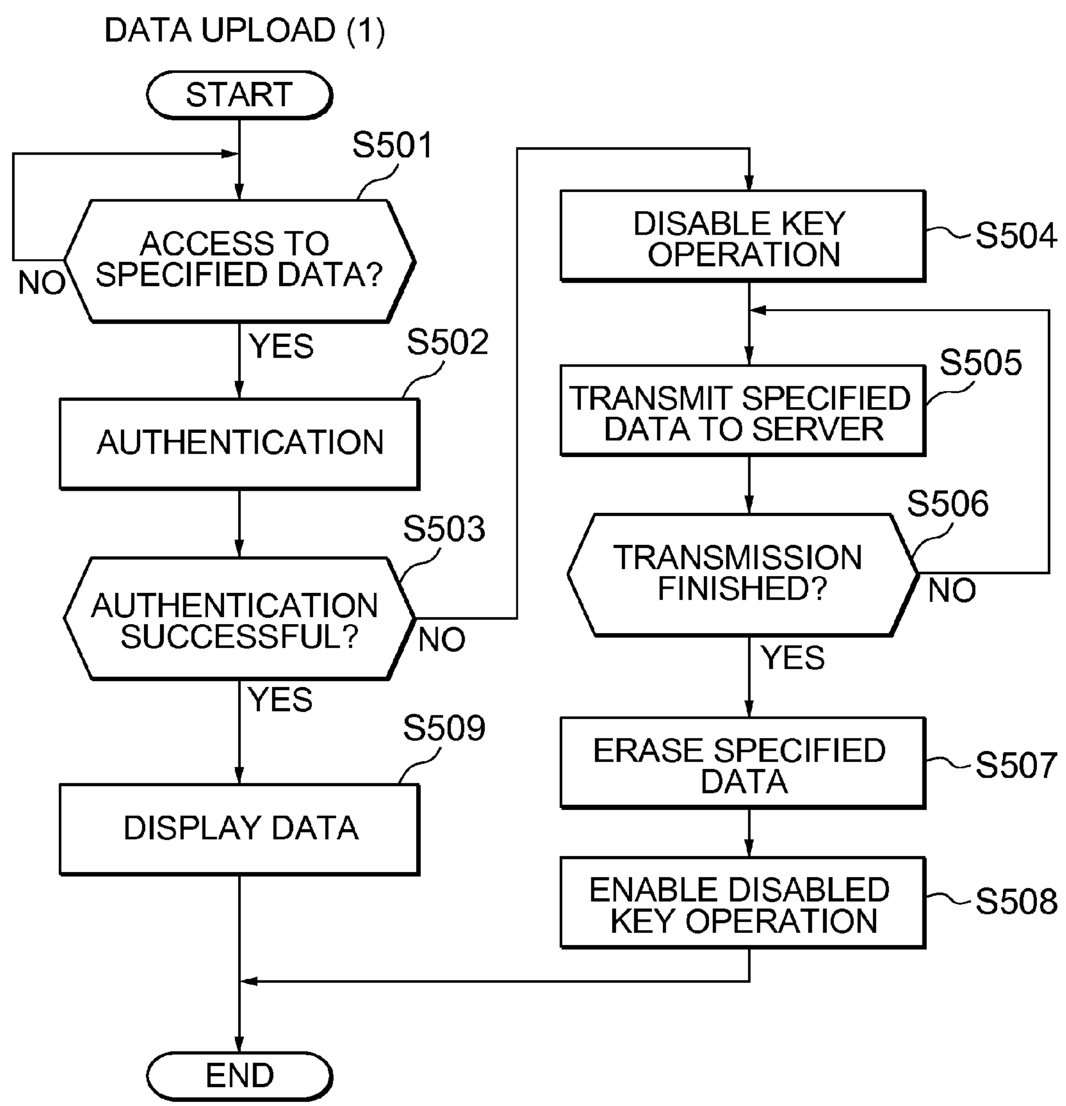
FIG. 5 shows a flowchart of an example of first upload processing in a preferred embodiment of the present invention.

FIG. 5 shows a first example of upload processing according to a preferred embodiment of the present invention.

When the first upload processing is used, it is supposed that at least authentication is performed when data to be uploaded is accessed. That is, even if authentication is not set initially for data that is accessed for browsing, authentication is automatically set when the data, specified as data to be uploaded, is accessed for uploading. Authentication, which confirms whether the user is authorized to access data, is usually performed on a cellular phone by receiving a password and checking its validity. It has to be noted that the authentication method is not limited to a password authentication method.

Referring to FIG. 5, when the user attempts to access predetermined specified data (Yes in S501), authentication processing is started, in step S502. For example, the user is requested to enter a password and the entered password is compared with a registered password, in step S502. If the passwords match, it is judged that the authentication is successful (Yes in S503) and the data is displayed to allow the user to perform operations, for example, to add, change, or delete data, as required, in step S509. If a password mismatch occurs more times than is pre-defined (No in S503), it is judged that an authentication error has occurred and the key operation is disabled, in step S504. This temporarily disables the acceptance of a key operation from the user. The mobile terminal apparatus accesses the network to transmit the specified data to the server, in step S505. It is assumed that server access information is saved in advance in the mobile terminal apparatus and that the authorized user of the mobile terminal apparatus has already been registered for the service provided by the server. When the data transmission is finished (Yes in S506), the specified data in the mobile terminal apparatus is erased, in step S507. After that, the disabled key operation is enabled, in step S508 and the processing ends.

The processing described above causes the server to "pump up" the specified data upon detecting an authentication error when a user who does not know a password attempts to improperly access/browse the specified data, thus preventing the user from improperly accessing the specified data. As it will be described later, a proper user can download this "pumped up" data back at a later time to the recovered mobile terminal apparatus or to a separate new terminal.

The first example of upload processing shown in FIG. 5 starts its function upon detecting an unauthorized access to a mobile terminal apparatus. It is also possible for a proper user, who has lost a mobile terminal apparatus, to remotely control the lost terminal via a communication network for uploading and erasing the specified data. This processing, a second example of upload processing according to a preferred embodiment of the present invention will be described with reference to FIG. 6.

The second example of upload processing is started by a proper user sending a specific electronic mail (also called simply an email in this specification) to a mobile terminal apparatus from which data is to be uploaded. To allow the user to do so, a predetermined keyword is included in the header information of the email. For example, a mail is sent to the mail address of the mobile terminal apparatus, for example, with a character string such as "*upload" in the Subject area of the email. The Message area of the mail may be left blank or may contain a fixed sentence in advance. A mail like this may be prepared in advance in the mobile terminal apparatus. The proper user is supposed to set the keyword in the mobile terminal apparatus, in advance.

Figure 6:
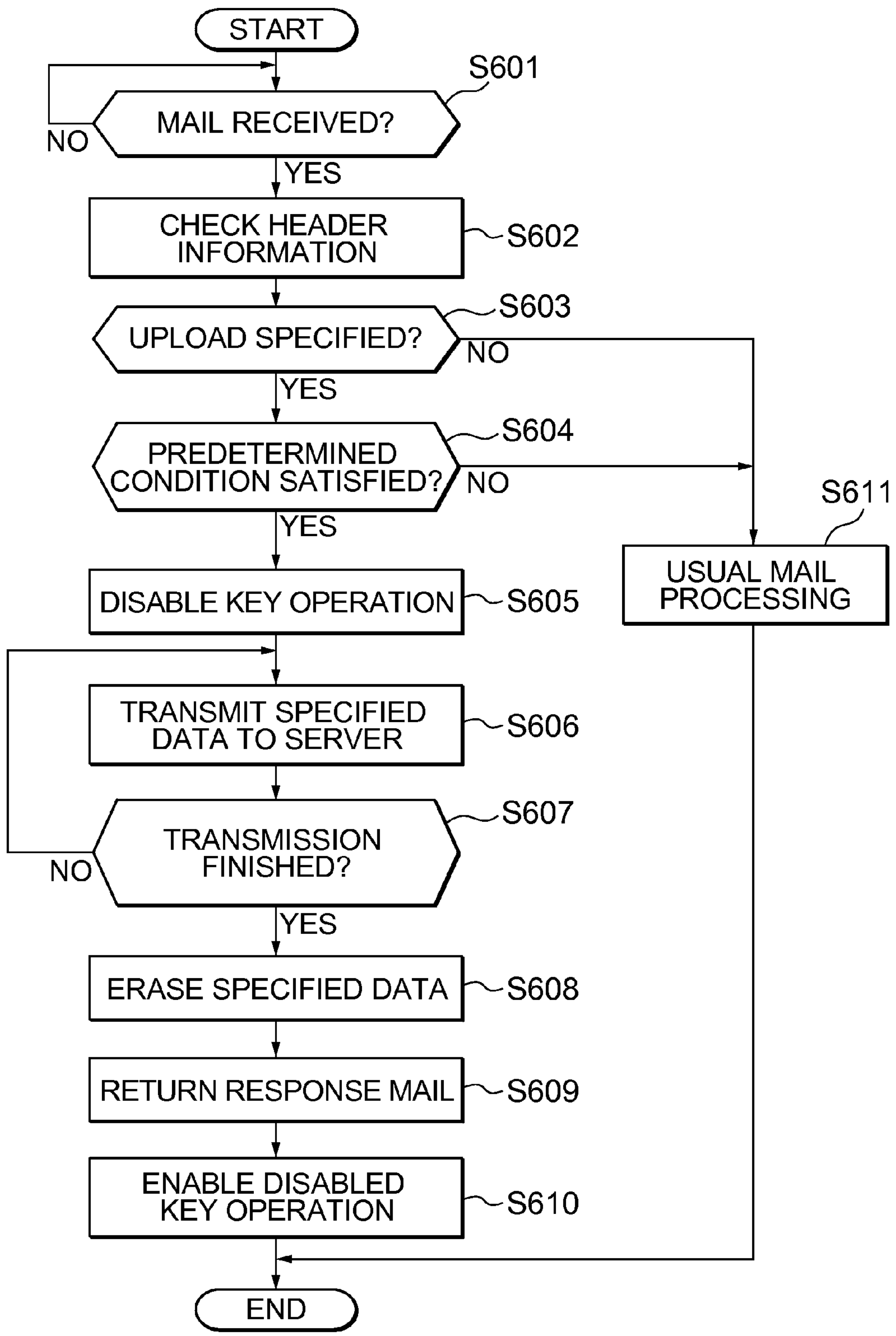
FIG. 6 shows a flowchart of an example of second upload processing in a preferred embodiment of the present invention.

Referring to FIG. 6, upon receiving a mail (Yes in S601), the mobile terminal apparatus checks the header information of the received mail, in step S602. If the mail is not an upload instruction mail as a result of the checking (No in S603), usual mail processing is performed, in step S611. If the mail is an upload instruction mail (Yes in S603), verification is made if a predetermined condition is satisfied, in step S604. The checking of this "predetermined condition" is another authentication function added to the header information checking. For example, at least one of the following two conditions may be used as the predetermined condition: one condition is that the sender information on the mail (sender's mail address, sender's name, etc.) matches a pre-registered sender information and another condition may be that the upload instruction mail is received a specified number of times within a specified time period. Verification of such a predetermined condition is preferably done when the header information checking is not enough, but this verification/checking is not always required.

If the predetermined condition is not satisfied, control is passed to step S611 to perform usual mail processing. If the predetermined condition is satisfied, the key operation is disabled, in step S605. Then, the mobile terminal apparatus accesses the network and transmits the specified data to the server, in step S606. After the transmission is finished, (Yes in S607), the specified data is erased, in step S608. Then, a response mail indicating that the specified data has been uploaded and erased is returned to the sender of the upload instruction mail, in step S609. Such a return mail may also be prepared in advance in the mobile terminal apparatus as the template. After that, the disabled key operation is enabled, in step S610 and the processing is ended.

As described above, the second data upload processing allows the user to upload the specified data stored in the mobile terminal apparatus and then erase it by sending an upload instruction mail from outside the mobile terminal apparatus.

Next, a third example of data upload processing according to a preferred embodiment of the present invention will be described with reference to FIG. 7. The third example of data upload processing is similar to the second data upload processing in that the proper user of a mobile terminal apparatus controls the lost mobile terminal apparatus remotely via a network except that the mobile terminal apparatus is controlled via sound, not by mail. In this case, the DTMF (Dual Tone Multi-Frequency) signal, called a tone signal, is usually used. This signal is an analog signal generated by pressing a touch-tone button on a telephone apparatus. Upon receiving a predetermined tone signal sequence, the receiver can recognize that a predetermined instruction is received from an external source.

More specifically, a mobile terminal apparatus such as a state-of the-art cellular phone has a function that places the mobile terminal apparatus in the message memo (answer phone) mode if a call is not answered within a predetermined number of call rings. During this response time, the input of the tone signal is accepted and, when the specified tone signal sequence is received, the terminal can move to this processing. Alternatively, after accepting a message memo, the terminal enters the automatic response mode to accept the input. In some cases, a malicious third party answers the call, in which case, the terminal cannot enter the automatic response mode. However, this third data upload processing is still useful when combined with other data upload processing described above.

Referring to FIG. 7, when a mobile terminal apparatus automatically receives a telephone call (Yes in S701), the mobile terminal apparatus enters the automatic response mode, in step S702, and performs authentication processing, in step S703. The authentication processing is performed, for example, by receiving a password and checking if it is correct. If the authentication is not successful (No in S704), the line is disconnected, in step S713) and the processing is ended.

If the authentication is successful (Yes in S704), the mobile terminal apparatus accepts the command, in step S705). If this command does not match the pre-registered command instructing to upload data (Yes in S706), the line is disconnected, in step S713, and the processing is ended. Several retries may be attempted before the line is disconnected. Preferably, the command is a numeric string registered in advance by the terminal user.

If the commands match (Yes in S706), the line is disconnected, in step S707, and the data upload processing is started. That is, the key operation is disabled, in step S708, and the specified data is transmitted to the server, in step S709. When the transmission is ended (Yes in S710), the specified data in the terminal is erased, in step S711. After that, the disabled key operation is enabled, in step S712 and the processing is ended.

It is possible that, after entering the automatic response mode and while the line is connected, an audio message created in advance may be generated and sent to the calling party to notify him or her about the operation guide and the operation result in response to the operation performed by the calling party.

Although the line is once disconnected in step S707 for data communication, the line may be disconnected not in step S707 but after the processing is ended, if sound communication and data communication can be performed at the same time. In that case, an audio message, typically a voice message, may be sent indicating that upload processing has completed. Alternatively, with a mail address (other that the one allocated to the terminal) of the proper user registered in the terminal in advance, the notification message may be sent automatically to the mail address when the upload processing is completed to notify the user about the status.

Figure 8:
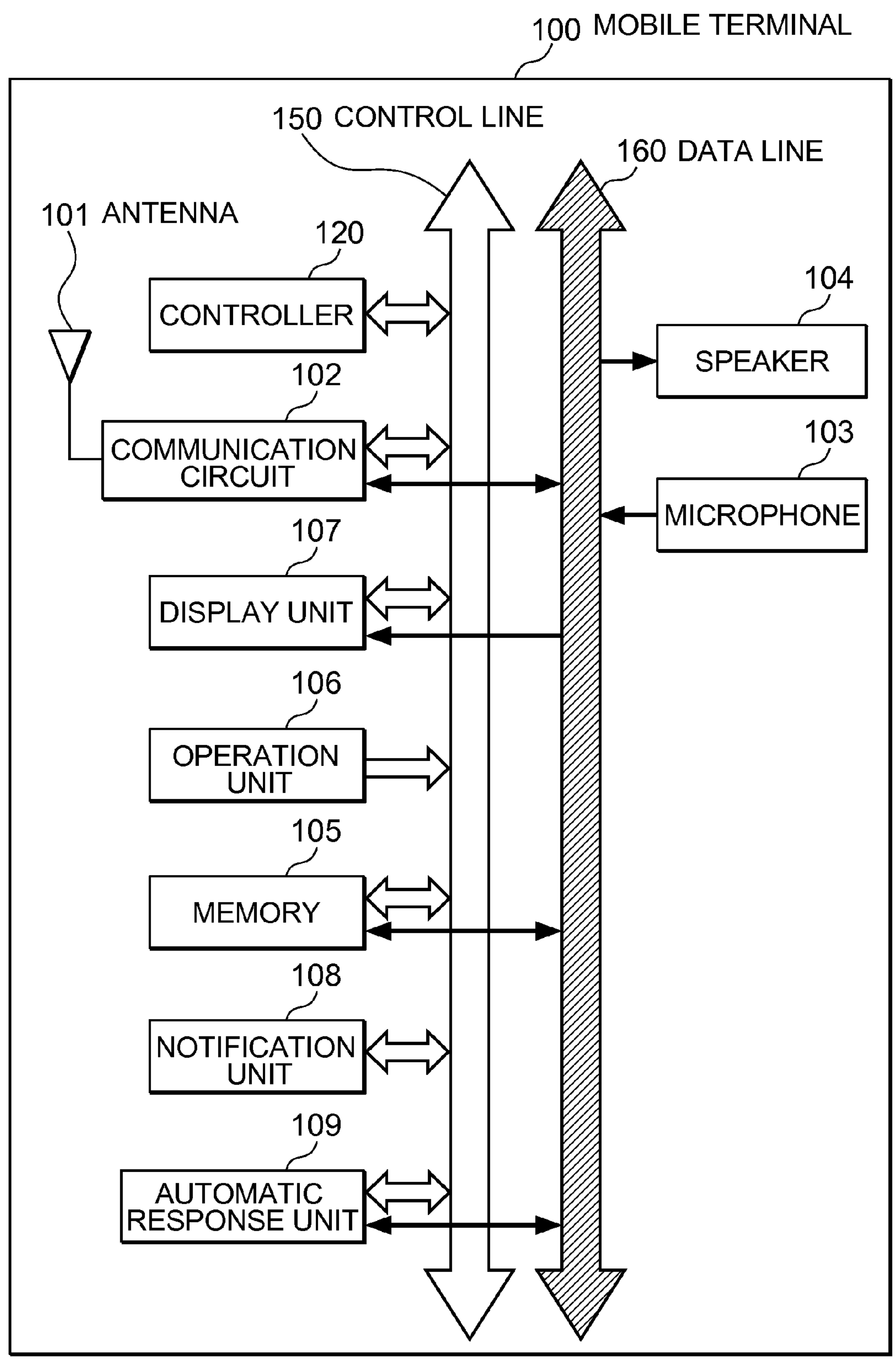
FIG. 8 shows a block diagram of an example of configuration of a mobile terminal apparatus corresponding to the third data upload processing shown in FIG. 7.

FIG. 8 shows an example of configuration of a mobile terminal apparatus capable of performing the third data upload processing in FIG. 7. This configuration is similar to the configuration shown in FIG. 2 except that an automatic response unit 109 is added. The automatic response unit 109 at least has a function to accept the tone signal described above and identify it and, preferably, an automatic voice response function. The rest of the configuration is similar to that shown in FIG. 2 and so will not be described in detail.

Figure 9:
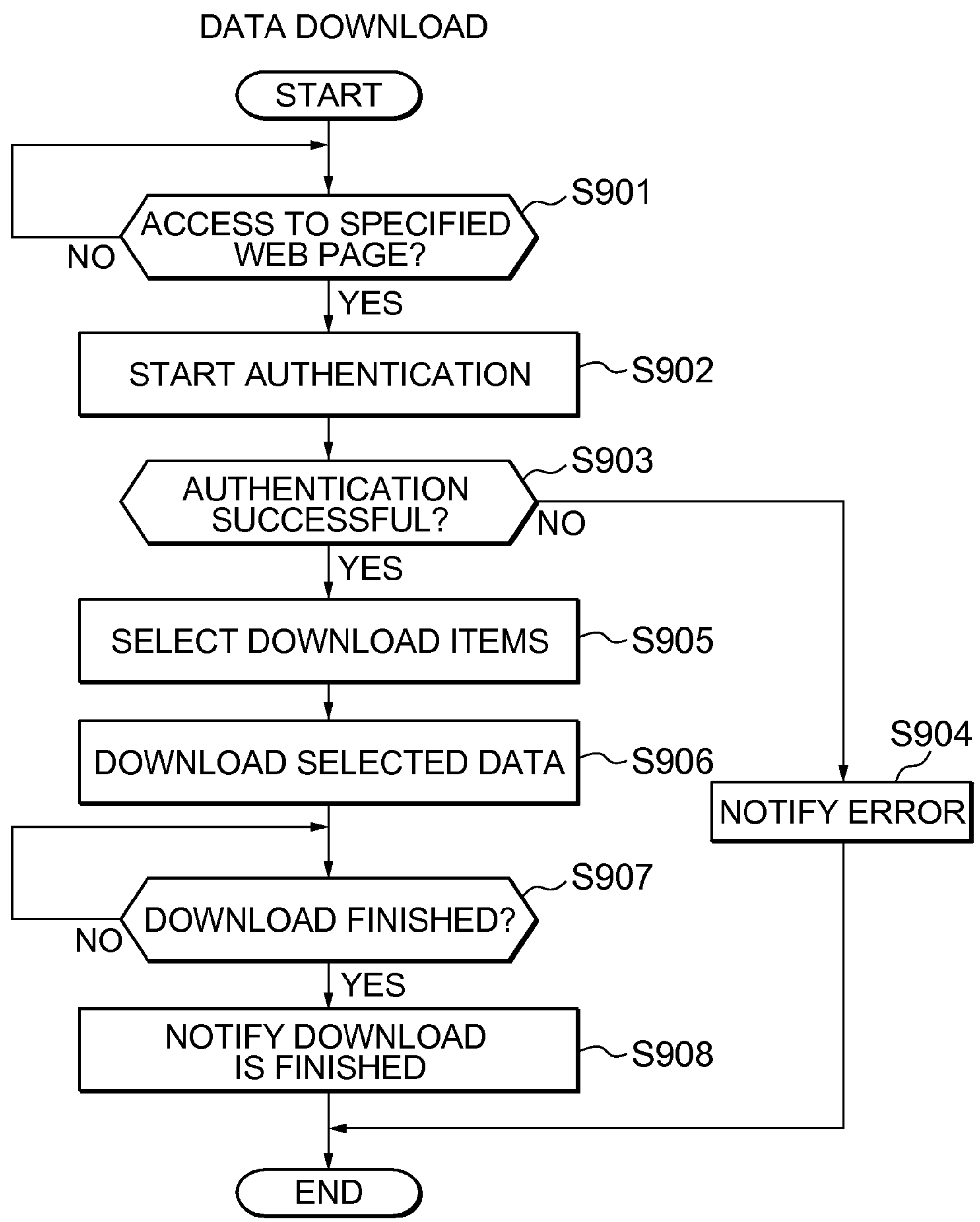
FIG. 9 shows a flowchart of data download processing according to a preferred embodiment of the present invention.

FIG. 9 shows data download processing that is performed to restore data, uploaded to the server as described above, to a terminal according to an instruction from the user of the mobile terminal apparatus from which the data was uploaded. The data does not need to be downloaded to the mobile terminal apparatus from which the data was uploaded nor does the data need to be downloaded to a mobile terminal apparatus of the same type. The user can also access the server from other terminals, such as a personal computer (PC).

It is supposed that a password for each user (user ID) is set in the server 300 for use in authentication. The mobile terminal apparatus 100 can browse the web page of the server via the base station/control station. The data of the specified web page is saved on the external storage device 302 of the server 300. When a mobile terminal apparatus accesses the specified web page, in step S901, authentication processing is started, in step S902. During authentication processing, the user name and the password are entered, for example, via the operation unit 106 of the mobile terminal apparatus and the received information is sent to the server 300 via the base station/control station. The server authenticates the user by comparing the received information with the password of each user stored in the server in advance. If the received user name is not found or, if found, a password mismatch is found, the server judges that an authentication error occurs (No in S903) and sends a notification to the terminal indicating the error. In response to this notification, the terminal notifies the user about the error, in step S904. Any notification method may be used; for example, a message is displayed on the display unit of the terminal, the LED is lit, a sound is generated, or a vibration is generated.

If the authentication is successful (Yes in S903), the user is requested to select download items, in step S905. In this case, it is possible to allow the user to select the saving destination of each selection item. If data with the same name as that of a download item is already in the selected saving destination, the data with the same name is overwritten. It is also possible to omit the step of overwrite saving if it is found, as a result of comparison between the two, that the data to be overwritten is identical to the data of a download item. Alternatively, instead of overwrite saving, synchronization may be established between the two so that the old data is changed to the new data. Authentication may be performed, not in the position shown in the flowchart, but after step S905.

Then, the selected data is downloaded, in step S906. If the uploaded data is fixed data (for example, address book, received mail folder, etc.) and no selection is necessary, step S905 may be omitted and S906 turns simply into a step of downloading data.

The download is finished when "end notification" is received from the server (Yes in S907). At this time, a message is displayed, for example, on the display unit to notify the user that the download is finished, in step S908, and then the processing is ended. The server may erase the downloaded data. This erasure may be done either automatically or upon receiving an instruction or agreement from the user.

Although the present invention has been described through preferred embodiments thereof, it is to be understood that the present invention is not limited to such embodiment but that various changes, modifications, combinations and sub combinations are possible without departing from the scope and spirit of the present invention.

For example, although a password authentication is used in the authentication method in step S502 in FIG. 5, the authentication method is not limited to this. For example, fingerprint authentication is possible on a terminal with the fingerprint authentication interface. For a proper user, a fingerprint authentication error is less likely to occur; therefore, a single authentication error (with no retry), if found, could be regarded that an unauthorized person attempted to access data.

When multiple authentication methods are available, the authentication method may be changed according to data that is accessed. Alternatively, multiple authentication methods may be combined. In this case, one of the following actions may be taken: (a) if an error is found in one of the methods, control is passed to step S504; (b) when an authentication error occurs, the authentication method is changed to the one at a higher authentication security level.

Although erased after being uploaded in the embodiment, data need not always be erased. Alternatively, whether to erase may be predetermined depending upon the type of data. In this case, the type of data to be erased may be either fixed or selected by the user. In either case, if data is not erased, it is preferable that data not be accessed at least for a given length of time (prevents authentication processing). Instead, it is also possible that multiple authentication methods prepared in advance are used beginning with the lowest security level method and, after an authentication error is found, a higher security level method is used. Although data need not be uploaded if not erased, the data may also be uploaded to ensure the data in the terminal after the terminal is lost.

It is also possible that, with a security level assigned to all data, whether or not the data is specified data, what authentication method is used, and what processing (whether to erase, whether to upload) is to be performed after an authentication error is found are set automatically based on the security level. The user may also specify them manually.

Although data itself is specified for uploading in the above description, data to be uploaded may also specified at an application level. In this case, data to be uploaded is data related to the application.

Although whether the received password matches the registered password is used as the match condition for password authentication in the above embodiment, the question and answer authentication method is also possible. That is, whether the user responds with an answer that matches the answer prepared for the user in advance may be used as the condition.

Although a specified web page is accessed using a user ID, the specified web page (URL) may be provided for each user to eliminate the need for the user to enter the user ID.

After step S904 in FIG. 9, it is also possible to prevent the user related data from being downloaded from the specified web page for a given length of time. In addition, the server may send a mail to the user corresponding to the user name indicating that the user has made an authentication error when issuing a download request. Because an authentication error is sometimes generated because a proper user forgets the password, the mail may include the password to notify the user again about the password.

After selecting items in step S905, it is also possible to allow the user to browse and edit the selected data. Data can be easily updated (for example, a new item can be added to the address book) by accessing the selected data via some other apparatus, editing the data, and downloading the data from the mobile terminal apparatus to establish synchronization.

We claim:

1. A mobile communication apparatus, comprising:

a communication circuit configured to perform wireless data communication with a communication network;

a storage unit configured to store data;

a controller configured to:

perform authentication to check if an operation is performed by a proper user, upload a first predetermined type of data stored in the storage unit to a predetermined server, the predetermined server being accessible from the mobile communication apparatus via a cellular base station, a gateway, and the communication network, erase a second predetermined type of data from the storage unit if a predetermined condition is satisfied in accordance with the authentication, wherein at least one of said upload and said erase is remotely controllable via said communication network.

2. The mobile communication apparatus of claim 1, wherein the predetermined condition is a negative result of the authentication occurring more than a predetermined number of consecutive times.

3. The mobile communication apparatus of claim 1, wherein the controller is configured to, when a negative result of the authentication occurs more than a second predetermined number of consecutive times, inhibit further performances of the authentication at least for a period of time.

4. The mobile communication apparatus of claim 1, wherein the controller is configured to change the authentication to an alternative form of authentication when a negative result of the authentication occurs more than a third predetermined number of consecutive times.

5. The mobile communication apparatus of claim 1, wherein the authentication check comprises comparing an input-received password to a previously registered password.

6. The mobile communication apparatus of claim 1, wherein the controller is configured to execute the upload in response to the predetermined condition being satisfied, and to execute the erase only after the predetermined type of data has been uploaded.

7. The mobile communication apparatus of claim 1, wherein the first predetermined type of data and the second predetermined type of data are the same.

8. The mobile communication apparatus of claim 1, wherein the second predetermined type of data includes address book data.

9. The mobile communication apparatus of claim 1, wherein the second predetermined type of data includes electronic mail data.

10. The mobile communication apparatus of claim 1, wherein the controller is configured to register an email address of the proper user.

11. The mobile communication apparatus of claim 1, wherein the controller is configured to receive a notification message sent to an email address of the proper user registered in advance.

12. The mobile communication apparatus of claim 1, wherein the controller is configured to perform browsing a web page of a server by communicating via the cellular base station.

13. The mobile communication apparatus of claim 12, wherein the controller is configured to access a specific web page in order to initiate a second authentication processing.

14. The mobile communication apparatus of claim 13, wherein the controller is configured to access the specific web page by using a user ID.

15. The mobile communication apparatus of claim 13, wherein the specific web page is such that there is no need for the proper user to enter a user ID.

16. The mobile communication apparatus of claim 1, wherein the authentication includes a fingerprint authentication.

17. The mobile communication apparatus of claim 1, wherein the data stored in the data storage unit have an assigned security level.

18. The mobile communication apparatus of claim 1, wherein the mobile communication apparatus has an email address allocated thereto, the controller is configured to register an email address of the proper user, which is different from the email address allocated to the mobile communication apparatus, and the controller is configured to automatically send a notification message to the registered email address of the proper user upon at least one of the upload and the erase being performed.

19. A mobile communication apparatus comprising:

a communication circuit configured to perform wireless data communication with a communication network;

a storage unit configured to store data;

a controller configured to:

perform authentication to check if an operation is performed by a proper user, and upload a first predetermine type of data stored in the storage unit to a predetermined server, the predetermined server being accessible from the mobile communication apparatus via a cellular base station, a gateway, and the communication network, disable input to the mobile communication apparatus upon detecting an authentication error in performing the authentication, and while disabling the input to the mobile communication apparatus:

communicate to the communication network, and erase a second predetermined type of data from the storage unit if a predetermined condition is satisfied in accordance with the authentication.

20. The mobile communication apparatus of claim 19, wherein the predetermined condition is a negative result of the authentication occurring more than a predetermined number of consecutive times.

21. The mobile communication apparatus of claim 19, wherein the controller is configured to, when a negative result of the authentication occurs more than a second predetermined number of consecutive times, inhibit further performances of the authentication at least for a period of time.

22. The mobile communication apparatus of claim 19, wherein the controller is configured to change the authentication to an alternative form of authentication when a negative result of the authentication occurs more than a third predetermined number of consecutive times.

23. The mobile communication apparatus of claim 19, wherein the authentication check comprises comparing an input-received password to a previously registered password.

24. The mobile communication apparatus of claim 19, wherein the controller is configured to execute the upload in response to the predetermined condition being satisfied, and to execute the erase only after the predetermined type of data has been uploaded.

25. The mobile communication apparatus of claim 19, wherein the first predetermined type of data and the second predetermined type of data are the same.

26. The mobile communication apparatus of claim 19, wherein the second predetermined type of data includes address book data.

27. The mobile communication apparatus of claim 19, wherein the second predetermined type of data includes electronic mail data.

28. The mobile communication apparatus of claim 19, wherein the controller is configured to register an email address of the proper user.

29. The mobile communication apparatus of claim 19, wherein the controller is configured to receive a notification message sent to an email address of the proper user registered in advance.

30. The mobile communication apparatus of claim 19, wherein the controller is configured to perform browsing a web page of a server by communicating via the cellular base station.

31. The mobile communication apparatus of claim 30, wherein the controller is configured to access a specific web page in order to initiate a second authentication processing.

32. The mobile communication apparatus of claim 31, wherein the controller is configured to access the specific web page by using a user ID.

33. The mobile communication apparatus of claim 31, wherein the specific web page is such that there is no need for the proper user to enter a user ID.

34. The mobile communication apparatus of claim 19, wherein the authentication includes a fingerprint authentication.

35. The mobile communication apparatus of claim 19, wherein the data stored in the data storage unit have an assigned security level.

36. The mobile communication apparatus of claim 19, wherein the mobile communication apparatus has an email address allocated thereto, the controller is configured to register an email address of the proper user, which is different from the email address allocated to the mobile communication apparatus, and the controller is configured to automatically send a notification message to the registered email address of the proper user upon at least one of the upload and the erase being performed.

* * * * *